US012783075B2

(12) United States Patent
Min

(10) Patent No.: US 12,783,075 B2
(45) Date of Patent: Nov. 3, 2026

(54) ELECTRONIC DEVICE

(71) Applicant: Huawei Technologies Co., Ltd., Shenzhen (CN)

(72) Inventor: Yancan Min, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/188,788

(22) Filed: Apr. 24, 2025

(65) Prior Publication Data

US 2025/0258559 A1 Aug. 14, 2025

Related U.S. Application Data

(63) Continuation of application No. PCT/CN2023/099688, filed on Jun. 12, 2023.

(30) Foreign Application Priority Data

Oct. 25, 2022 (CN) ........................ 202211314271.5

(51) Int. Cl.
*G06F 3/041* (2006.01)
*G09G 3/20* (2006.01)

(52) U.S. Cl.
CPC .......... *G06F 3/0416* (2013.01); *G06F 3/0412* (2013.01); *G09G 3/2096* (2013.01)

(58) Field of Classification Search
CPC .................................................. G09G 3/2096
USPC ................................................ 345/173–174
See application file for complete search history.

(56) References Cited

U.S. PATENT DOCUMENTS 8,780,065 B2 * 7/2014 Ribeiro .................. G06F 3/017 345/173
2019/0258539 A1 * 8/2019 Zhu ..................... G06F 13/1668
2019/0354218 A1 * 11/2019 Tang ..................... G06F 3/0412
2021/0072843 A1 * 3/2021 Komatsu ............. G06F 3/03545
2021/0255727 A1 * 8/2021 Pirogov ................ G06F 3/0412
2021/0255753 A1 * 8/2021 Ahn ..................... G06F 3/04184
2022/0066881 A1 * 3/2022 Jeon .................... G06F 11/0742

FOREIGN PATENT DOCUMENTS

CN 109976570 A 7/2019
WO 2022193694 A1 9/2022

* cited by examiner

*Primary Examiner* — Kwin Xie
(74) *Attorney, Agent, or Firm* — Conley Rose, P.C.

(57) ABSTRACT

An electronic device includes a touch display panel having touch and display functions. The electronic device further includes a TCON and a TIC. The TCON is configured to provide a timing control signal for the touch display panel, and the TIC is configured to provide a touch signal for the touch display panel. The electronic device further includes a circuit board and the non-volatile memory. The circuit board is coupled to the touch display panel, and the TIC is disposed on the circuit board.

20 Claims, 6 Drawing Sheets

ELECTRONIC DEVICE

CROSS-REFERENCE TO RELATED APPLICATION

This is a continuation of International Patent Application No. PCT/CN2023/099688 filed on Jun. 12, 2023, which claims priority to Chinese Patent Application No. 202211314271.5 filed on Oct. 25, 2022, which are hereby incorporated by reference in their entireties.

TECHNICAL FIELD

This disclosure relates to the field of display technologies, and in particular, to an electronic device.

BACKGROUND

With development of display technologies, electronic devices with display functions become indispensable electronic tools in people's daily life.

In a mainstream organic light-emitting diode (OLED) electronic device, a timing controller (TCON) configured to provide a timing control signal for the electronic device and a touch integrated circuit (TIC) configured to provide a touch signal for the electronic device are two independent structures. During working, both the TCON and the TIC need to access a non-volatile memory, to output the timing control signal and the touch signal.

Therefore, resolving a problem of matching the non-volatile memory with the TCON and the TIC is always a research hotspot in the art.

SUMMARY

Embodiments of this disclosure provide an electronic device, to resolve a problem of matching a non-volatile memory with a TCON and a TIC.

To achieve the foregoing objective, this disclosure uses the following technical solutions.

According to a first aspect of embodiments of this disclosure, an electronic device is provided. The electronic device is, for example, an electronic device with a touch function. The electronic device includes a touch display panel, and the touch display panel has touch and display functions. The electronic device further includes a TCON and a TIC. The TCON is configured to provide a timing control signal for the touch display panel, and the TIC is configured to provide a touch signal for the touch display panel. The electronic device further includes a circuit board and a non-volatile memory. The circuit board is coupled to the touch display panel, and the TIC is disposed on the circuit board. The non-volatile memory is disposed outside the TIC, and the non-volatile memory is configured to provide a non-volatile storage function for both the TCON and the TIC. In other words, in the electronic device provided in embodiments of this disclosure, no non-volatile memory is integrated into the TIC.

In the electronic device provided in embodiments of this disclosure, the TCON and the TIC are jointly designed, and share the same non-volatile memory, and the non-volatile memory is disposed outside the TIC. No flash memory needs to be disposed in the TIC, and a non-volatile storage requirement of the TIC is satisfied by the non-volatile memory coupled to the TCON. Therefore, this resolves a problem that the TIC cannot be prepared independently because a specific technology compatible with a flash memory preparing process needs to be used to integrate a flash memory into the TIC. In addition, no flash memory needs to be integrated into the TIC, and a problem that the TIC cannot be independently prepared because the flash memory needs to be purchased can also be resolved. In addition, a mainstream electronic device includes a non-volatile memory coupled to the TCON. In the electronic device provided in embodiments of this disclosure, it is equivalent to reusing the non-volatile memory for the TIC, and a technology for the electronic device is not changed too much. In comparison with the mainstream electronic device with an additional flash memory integrated into the TIC, the electronic device provided in embodiments of this disclosure has low preparation costs.

In a possible implementation, the electronic device further includes an arbitration controller. The arbitration controller is configured to schedule the TCON or the TIC to communicate with the non-volatile memory. The TCON and the TIC share the non-volatile memory in a time-sharing manner by using the arbitration controller. A principle is simple and implementation is easy.

In a possible implementation, the arbitration controller is configured to determine whether the TCON accesses the non-volatile memory, and when the TCON accesses the non-volatile memory, block the TIC from communicating with the non-volatile memory, or when the TCON does not access the non-volatile memory, schedule the TIC to communicate with the non-volatile memory. An arbitration function of the arbitration controller is implemented by using digital logic. A structure is simple.

In a possible implementation, the electronic device includes a display driver integrated circuit (DDIC). The TCON and/or the arbitration controller are/is integrated into the DDIC. This disclosure is applicable to an electronic device with high integration, for example, a mobile phone or a wearable device.

In a possible implementation, the TCON is disposed on the circuit board, and the arbitration controller is integrated into the TCON. This disclosure is applicable to an electronic device with relatively low integration, for example, a notebook computer or a tablet computer.

In a possible implementation, the electronic device further includes an enable control line. The enable control line is configured to select and enable the TCON or the TIC to perform signal transmission with the non-volatile memory. The TCON and the TIC share the non-volatile memory in a time-sharing manner by using the enable control line. A structure is simple and implementation is easy.

In a possible implementation, the electronic device includes a DDIC, and the TCON is integrated into the DDIC, the DDIC has a first communication interface, the TIC has a second communication interface, and the non-volatile memory is coupled to the first communication interface and the second communication interface, and two ends of the enable control line are coupled to the DDIC and the TIC, and the enable control line includes a first control line and a second control line, and when the first control line is valid, the DDIC controls the first communication interface to be in a high-impedance state, or when the second control line is valid, the TIC controls the second communication interface to be in a high-impedance state. In this solution, a structure is simple, and structures of the DDIC and the TIC do not need to be changed. This is easy to implement.

In a possible implementation, the first communication interface and the second communication interface perform wire-AND. In this way, the non-volatile memory may be coupled to both the first communication interface and the second communication interface through one communication interface, thereby reducing a quantity of communication interfaces on the non-volatile memory.

In a possible implementation, the TCON is disposed on the circuit board, the TCON has a third communication interface, the TIC has a fourth communication interface, and the non-volatile memory is coupled to the third communication interface and the fourth communication interface, and two ends of the enable control line are coupled to the TCON and the TIC, and the enable control line includes a third control line and a fourth control line, and when the third control line is valid, the TCON controls the third communication interface to be in a high-impedance state, or when the fourth control line is valid, the TIC controls the fourth communication interface to be in a high-impedance state. In this solution, a structure is simple, and structures of the TCON and the TIC do not need to be changed. This is easy to implement.

In a possible implementation, the third communication interface and the fourth communication interface perform wire-AND. In this way, the non-volatile memory may be coupled to both the third communication interface and the fourth communication interface through one communication interface, thereby reducing a quantity of communication interfaces on the non-volatile memory.

In a possible implementation, the first communication interface, the second communication interface, the third communication interface, and the fourth communication interface are all serial peripheral interfaces (SPIs). This is a possible implementation.

In a possible implementation, the non-volatile memory includes a flash memory. In this way, an existing flash memory in the mainstream electronic device may be used as the non-volatile memory of the electronic device in embodiments of this disclosure, and a change to the electronic device is small.

In a possible implementation, the non-volatile memory is disposed on the circuit board. In this way, the existing flash memory in the mainstream electronic device may be used as the non-volatile memory of the electronic device in embodiments of this disclosure, and a change to the electronic device is small.

In a possible implementation, the electronic device includes a DDIC. The TCON and the non-volatile memory are integrated into the DDIC. In this way, the non-volatile memory may be directly formed when the DDIC is formed, so that integration can be improved, and a connection between the TCON and the non-volatile memory is simplified.

In a possible implementation, the TCON is disposed on the circuit board, and the non-volatile memory is integrated into the TCON. In this way, the non-volatile memory may be directly formed when the TCON is formed, so that integration can be improved, and a connection between the TCON and the non-volatile memory is simplified.

In a possible implementation, the electronic device further includes a protocol converter. The protocol converter is configured to match a communication interface of the TIC with a communication interface of the non-volatile memory. The protocol converter is disposed, so that a type requirement on a connection interface between the TIC and the non-volatile memory can be reduced, to be applicable to an existing TIC and an existing non-volatile memory.

In a possible implementation, the TIC includes an SPI, and the non-volatile memory includes a memory interface. The SPI is coupled to the memory interface through the protocol converter. This is an implementation.

In a possible implementation, the protocol converter is integrated into the DDIC or the TCON. This is an implementation.

In a possible implementation, the non-volatile memory includes a first non-volatile storage area and a second non-volatile storage area. The first non-volatile storage area is configured to provide a non-volatile storage function for the TCON, and the second non-volatile storage area is configured to provide a non-volatile storage function for the TIC. This is an implementation with a simple structure.

In a possible implementation, the electronic device is an OLED electronic device. Embodiments of this disclosure can resolve a problem of sharing a non-volatile memory by a TCON and a TIC in the OLED electronic device.

DESCRIPTION OF EMBODIMENTS

Figure 1A:
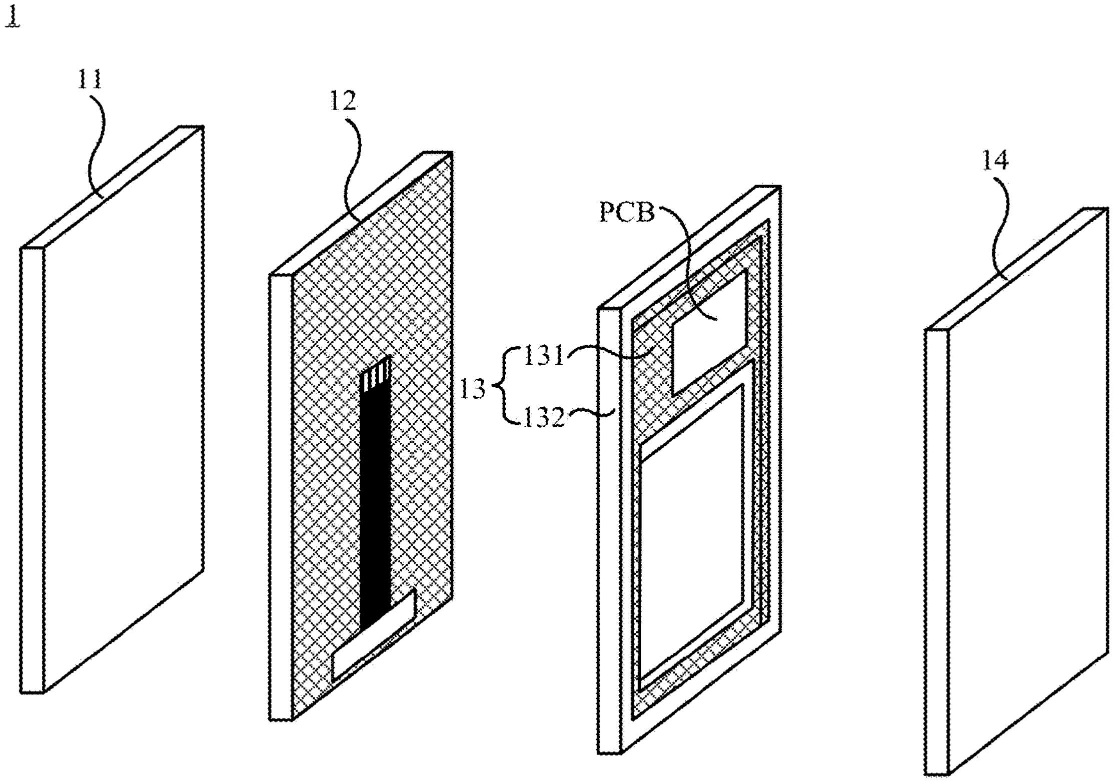
FIG. 1A is a diagram of a framework of an electronic device according to an embodiment.

The following describes the technical solutions in embodiments of this disclosure with reference to the accompanying drawings in embodiments of this disclosure. It is clear that the described embodiments are merely a part rather than all of embodiments of this disclosure.

The terms such as "first" and "second" below are only for ease of description, and cannot be understood as indicating or implying relative importance or implicitly indicating a quantity of indicated technical features. Therefore, a feature limited by "first", "second", or the like may explicitly or implicitly include one or more features. In the descriptions of this disclosure, unless otherwise stated, "a plurality of" means two or more than two.

In addition, in embodiments of this disclosure, orientation terms such as "upper", "lower", "left", and "right" may include but are not limited to definitions based on illustrated orientations in which components in the accompanying drawings are placed. It should be understood that, these direction terms may be relative concepts. The orientation terms are used for relative description and clarification, and may vary accordingly depending on a change in the orientations in which the components in the accompanying drawings are placed in the accompanying drawings.

In embodiments of this disclosure, unless otherwise clearly specified and limited, the term “connection” should be understood in a broad sense. For example, the “connection” may indicate a fixed connection, a detachable connection, or an integral connection, or may indicate direct interconnection, or indirect interconnection through an intermediate medium. In addition, the term “coupling” may indicate a direct electrical connection, or may indicate an indirect electrical connection through an intermediate medium. The term “contact” may indicate direct contact or indirect contact through an intermediate medium.

In embodiments of this disclosure, the term “and/or” describes an association relationship between associated objects and may indicate that three relationships exist. For example, A and/or B may indicate the following cases: only A exists, both A and B exist, and only B exists, where A and B may be singular or plural. The character “/” generally indicates an “or” relationship between the associated objects.

Embodiments of this disclosure provide an electronic device. The electronic device is, for example, a consumer electronic product, a home electronic product, a vehicle-mounted electronic product, a financial terminal product, or a communication electronic product with a touch function. The consumer electronic product is, for example, a mobile phone, a tablet computer (IPAD), a notebook computer, an e-reader, a personal computer (PC), a personal digital assistant (PDA), a desktop display, an intelligent wearable product (for example, a smart watch or a smart band), a virtual reality (VR) terminal device, an augmented reality (AR) terminal device, or an uncrewed aerial vehicle. The home electronic product is, for example, a smart door lock, a television, a remote control, a refrigerator, or a small household rechargeable appliance (for example, a soy milk maker or a robot vacuum cleaner). The vehicle-mounted electronic product is, for example, a vehicle-mounted navigator or a vehicle-mounted high-density digital video disc (DVD). The financial terminal product is, for example, an automated teller machine (ATM), or a terminal for self-service business handling. The communication electronic product is, for example, a communication device such as a server, a non-volatile memory, a radar, or a base station.

For ease of description, the following uses an example in which the electronic device is a mobile phone for description. As shown in FIG. 1A, an electronic device 1 mainly includes a cover plate 11, a touch display panel 12, a middle frame 13, and a rear housing 14. The rear housing 14 and the touch display panel 12 are respectively located on two sides of the middle frame 13, the middle frame 13 and the touch display panel 12 are disposed in the rear housing 14, the cover plate 11 is disposed on a side that is of the touch display panel 12 and that is away from the middle frame 13, and a display surface of the touch display panel 12 faces the cover plate 11.

The touch display panel 12 may be a liquid-crystal display (LCD). In this case, the liquid crystal display includes a liquid crystal touch display panel and a backlight module. The liquid crystal touch display panel is disposed between the cover plate 11 and the backlight module, and the backlight module is configured to provide a light source for the liquid crystal touch display panel. The touch display panel 12 may alternatively be an OLED display. Because the OLED display is a self-luminous display, no backlight module needs to be disposed.

The middle frame 13 includes a bearing plate 131 and a side frame 132 surrounding the bearing plate 131. The electronic device 1 may further include electronic components such as a printed circuit board (PCB), a battery, and a camera. The electronic components such as the PCB, the battery, and the camera may be disposed on the bearing plate 131.

Figure 1B:
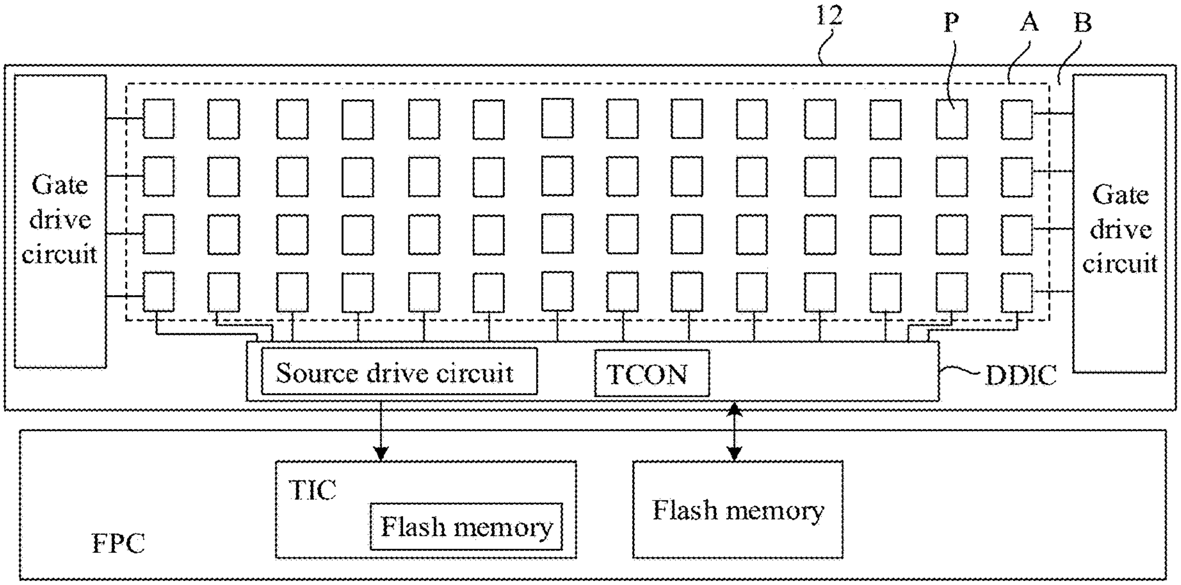
FIG. 1B is a layout diagram of an electronic device according to an embodiment.

As shown in FIG. 1B, the touch display panel 12 includes an active area (AA) A and a peripheral area B located around the active area A.

In some embodiments, the active area A of the touch display panel 12 is used as a display area of the electronic device 1, and the peripheral area B of the touch display panel 12 is used as a non-display area of the electronic device 1.

As shown in FIG. 1B, the active area A of the touch display panel 12 includes a plurality of sub-pixels P. For ease of description, in this disclosure, descriptions are provided by using an example in which the plurality of sub-pixels P are arranged in a form of matrix. In this case, sub-pixels P arranged in a line in a horizontal direction are referred to as sub-pixels in a same row, and sub-pixels P arranged in a line in a vertical direction are referred to as sub-pixels in a same column.

The electronic device 1 includes a gate drive circuit and a source drive circuit that are located in the peripheral area B of the touch display panel 12. The gate drive circuit is configured to provide a gate drive signal for the sub-pixel P, and the source drive circuit is configured to provide a source drive signal for the sub-pixel P.

For example, the gate drive circuit may be integrated into the touch display panel 12 by using, for example, a gate on array (GOA) technology. The gate drive circuit includes a plurality of cascaded shift registers (SRs).

There may be one or more gate drive circuits. For example, as shown in FIG. 1B, the electronic device 1 includes two gate drive circuits, and the two gate drive circuits are disposed on two sides of the active area A in the horizontal direction.

For example, the source drive circuit may be integrated into a DDIC. For example, the DDIC is directly attached to the touch display panel 12 in a form of die.

A TIC is configured to provide a touch signal for the electronic device 1. The DDIC responsible for display and the TIC responsible for touch are two independent chips.

For example, as shown in FIG. 1B, the DDIC is located in the touch display panel 12, and the TIC is located on a flexible printed circuit (FPC).

The electronic device further includes a TCON. In some embodiments, as shown in FIG. 1B, the TCON is integrated into the DDIC, and the TCON is configured to provide a timing signal for the gate drive circuit and the source drive circuit in the touch display panel 12.

To resolve a problem of matching a non-volatile memory with a TCON and a TIC, in some technologies, as shown in FIG. 1B, the TCON in the DDIC is externally connected to an independent flash memory, and a flash memory is integrated into the TIC.

Figure 1C:
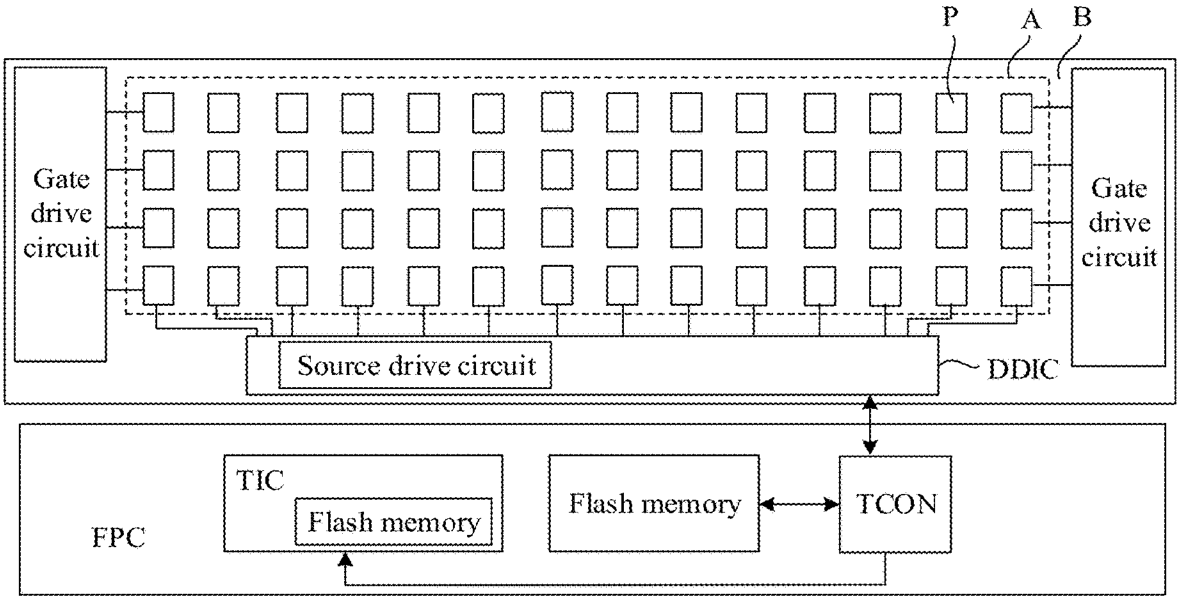
FIG. 1C is a layout diagram of another electronic device according to an embodiment.

As shown in FIG. 1C, in some electronic devices with large screens, for example, a notebook computer (note book) and a tablet computer (IPAD), a TCON is no longer integrated into a DDIC, but is disposed on an FPC.

In this case, the DDIC is coupled to the TCON, and the TCON is directly coupled to an external flash memory.

In both of an electronic device in which a TCON is integrated into a DDIC and an electronic device in which a TCON is disposed on an FPC, a flash memory is integrated into a TIC.

Figure 2A:
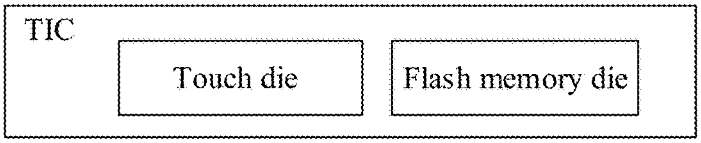
FIG. 2A is a diagram of an internal structure of a TIC according to an embodiment.

For a manner of integrating a flash memory into a TIC, in some technologies, as shown in FIG. 2A, a touch die and a flash memory die are packaged in a same chip, so that the flash memory is integrated into the TIC.

However, in this manner, the flash memory die accounts for about 15% of costs of the TIC, and the flash memory die needs to be purchased. This is not conducive to self-preparation.

Figure 2B:
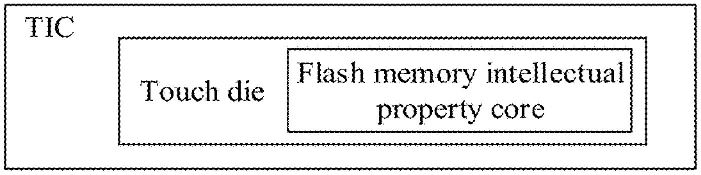
FIG. 2B is a diagram of an internal structure of another TIC according to an embodiment.

For a manner of integrating a flash memory into a TIC, in some other technologies, as shown in FIG. 2B, when a touch die is prepared, a flash memory intellectual property core is directly integrated into the touch die, so that the flash memory is integrated into the TIC.

However, in this manner, a preparing process of an embedded flash memory (eFlash) technology that supports an on-chip flash memory intellectual property core needs to be selected for the touch die. This increases supply difficulty. As a result, preparing costs of the flash memory intellectual property (IP) core account for about 25% of costs of the TIC.

In view of this, embodiments of this disclosure further provide an electronic device, to reduce costs of a TIC while meeting non-volatile storage requirements of a TCON and the TIC.

Figure 3A:
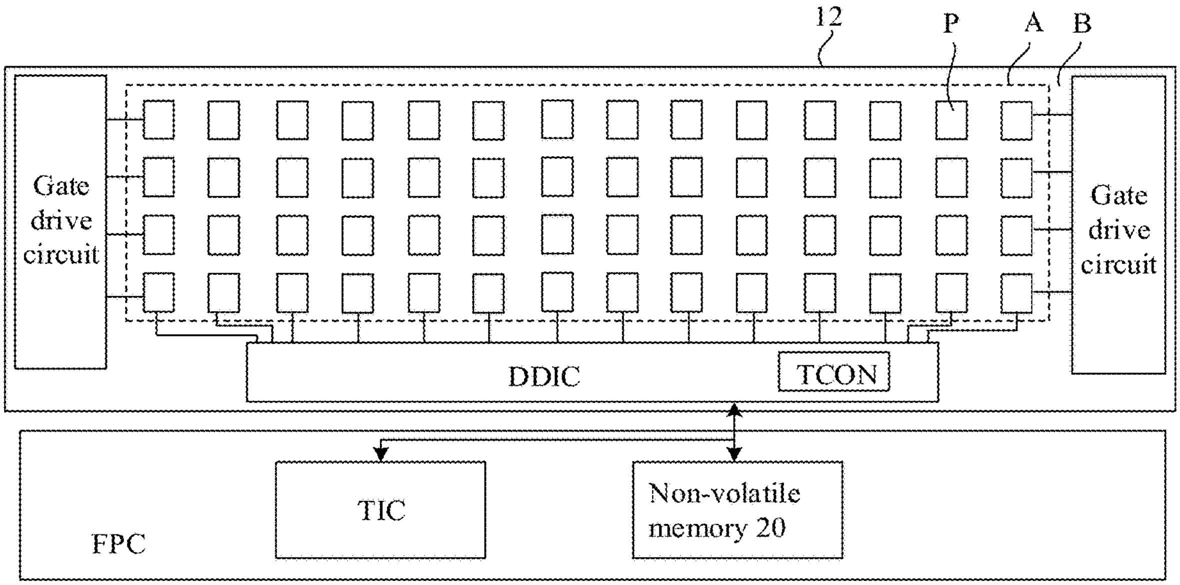
FIG. 3A is a layout diagram of an electronic device according to an embodiment.

As shown in FIG. 3A, the electronic device includes a touch display panel 12, a DDIC, a TCON, a TIC, a circuit board, and a non-volatile memory 20.

The touch display panel 12 may be any panel with touch and display functions. For example, the touch display panel 12 is an OLED display panel with a touch function.

The DDIC is configured to provide a drive signal for the touch display panel 12. For example, the DDIC is located inside the touch display panel 12 and is attached to a display of the touch display panel.

Figure 3B:
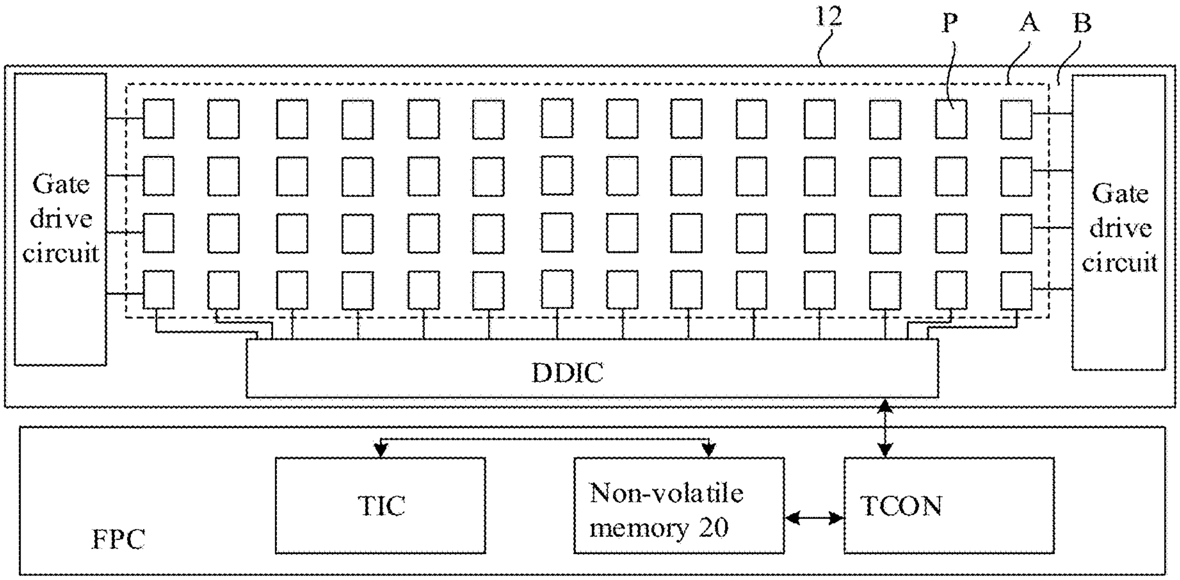
FIG. 3B is a layout diagram of another electronic device according to an embodiment.

The TCON is configured to provide a touch timing control signal for the touch display panel 12. As shown in FIG. 3A, the TCON is integrated into the DDIC. Alternatively, as shown in FIG. 3B, the TCON is disposed on the circuit board.

The circuit board is connected to the touch display panel 12 and is configured to implement coupling between the touch display panel 12 and a PCB in the electronic device. The circuit board may be, for example, an FPC, or the circuit board may be a circuit board in any form, provided that the circuit board can implement coupling between the DDIC and the PCB. For ease of description, in the following embodiments of this disclosure, an example in which the circuit board is an FPC is used for description.

The TIC is disposed on the FPC and is configured to provide a touch signal for the touch display panel 12.

The non-volatile memory 20 is disposed outside the TIC, and the non-volatile memory 20 is configured to provide a non-volatile storage function for both the TCON and the TIC.

Alternatively, it is understood that in this embodiment of this disclosure, the TCON and the TIC share the same non-volatile memory 20, instead of being correspondingly provided with respective flash memories.

The non-volatile memory 20 may be reused in a time-sharing manner. That is, at a moment, the non-volatile memory 20 is connected to the TCON, and at another moment, the non-volatile memory 20 is connected to the TIC.

Alternatively, the non-volatile memory 20 may be used by area. That is, an area of the non-volatile memory 20 is connected to the TCON, and another area of the non-volatile memory 20 is connected to the TIC.

Alternatively, the non-volatile memory 20 may be shared in any other form, provided that the non-volatile memory 20 can meet non-volatile storage requirements of both the TCON and the TIC.

In the electronic device provided in embodiments of this disclosure, the TCON and the TIC are jointly designed, and share the same non-volatile memory 20, and the non-volatile memory 20 is disposed outside the TIC. No flash memory needs to be disposed in the TIC, and a non-volatile storage requirement of the TIC is satisfied by the non-volatile memory 20 coupled to the TCON. In this way, a problem of high costs of the TIC caused by integration of a flash memory in the TIC is resolved. In addition, no flash memory needs to be integrated into the TIC, and a problem that the TIC cannot be independently prepared because the flash memory needs to be purchased can also be resolved. In addition, a mainstream electronic device includes a non-volatile memory 20 coupled to the TCON. In the electronic device provided in embodiments of this disclosure, it is equivalent to reusing the non-volatile memory 20 for the TIC, and a technology for the electronic device is not changed too much. In comparison with the mainstream electronic device with an additional flash memory integrated into the TIC, the electronic device provided in embodiments of this disclosure has low preparation costs.

The TCON in the electronic device being integrated into the DDIC and the TCON being disposed on the FPC are separately described below.

In a possible implementation, the TCON is integrated into the DDIC. For example, the electronic device is a small electronic device that has a high integration requirement, for example, a mobile phone, a telephone watch, or a band.

Example 1

Figure 4:
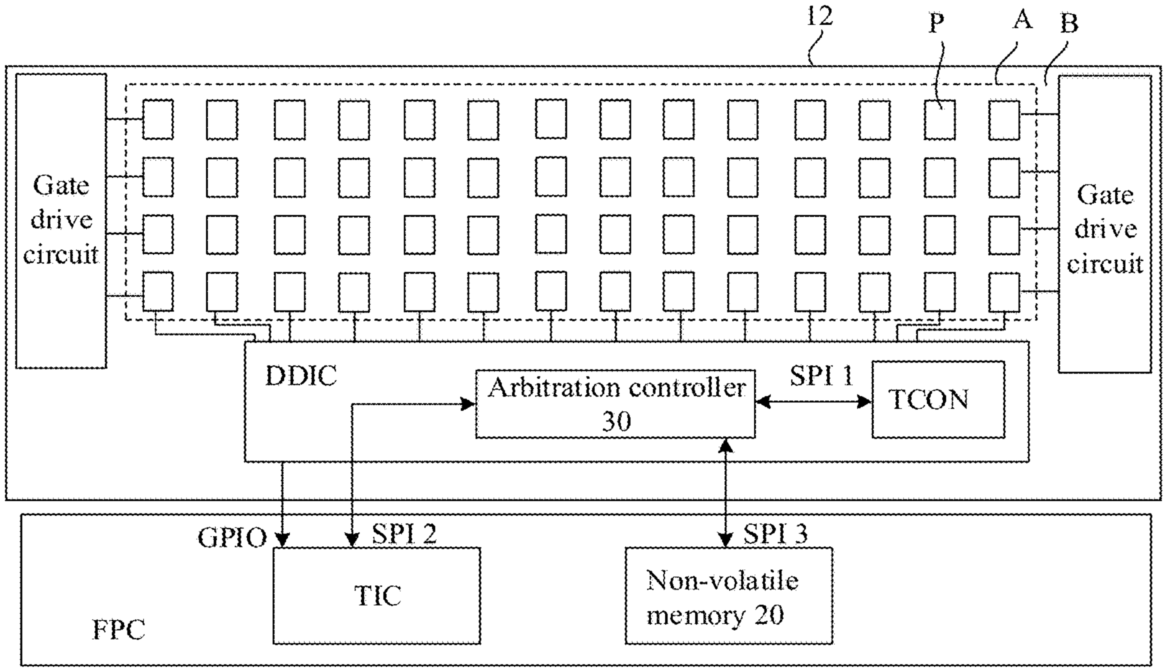
FIG. 4 is a layout diagram of another electronic device according to an embodiment.

As shown in FIG. 4, an electronic device includes a touch display panel 12, a DDIC, a TCON, a TIC, an FPC, and a non-volatile memory 20.

The TCON is integrated into the DDIC. The non-volatile memory 20 is disposed outside the TIC, and the non-volatile memory 20 is configured to provide a non-volatile storage function for both the TCON and the TIC.

In some embodiments, the electronic device further includes an arbitration controller 30. The arbitration controller 30 is configured to schedule the TCON or the TIC to communicate with the non-volatile memory 20.

In this case, the arbitration controller 30 is configured to control the TCON in the DDIC and the TIC to access and be externally connected to the non-volatile memory 20 in a time-sharing manner. Under scheduling of the arbitration controller 30, at a moment, the TCON communicates with the non-volatile memory 20, or the TIC communicates with the non-volatile memory 20. A case in which the TCON and the TIC simultaneously communicate with the non-volatile memory 20 does not occur.

Because the TCON needs to load content to the non-volatile memory 20 only in a power-on initialization process, after loading is completed, the non-volatile memory 20 is no longer accessed in a subsequent display process. Therefore, when the TCON is powered on and initialized, the arbitration controller 30 schedules the TCON to communicate with the non-volatile memory 20, and after the TCON is powered on and initialized, the arbitration controller 30 schedules the TIC to communicate with the non-volatile memory 20. There is no conflict between the TCON and the TIC in time-sharing reuse of the non-volatile memory 20.

In some embodiments, as shown in FIG. 4, the arbitration controller 30 is integrated into the DDIC.

For example, the TCON has a first SPI (SPI 1), the TIC has a second SPI (SPI 2), and the non-volatile memory 20 has a third SPI (SPI 3). The TCON is coupled to the arbitration controller 30 through the SPI 1, the TIC is coupled to the arbitration controller 30 in the DDIC through the SPI 2, and the non-volatile memory 20 is coupled to the arbitration controller 30 in the DDIC through the third SPI (SPI 3), to implement coupling between the non-volatile memory 20 and the arbitration controller 30 in the DDIC.

In this way, the arbitration controller 30 is coupled to the TIC, the TCON, and the non-volatile memory 20. The arbitration controller 30 controls the TIC to communicate with the non-volatile memory 20, or the TCON to communicate with the non-volatile memory 20, to implement time-sharing reuse of the non-volatile memory 20.

For a structure of the arbitration controller 30, in some embodiments, the arbitration controller 30 may be implemented, for example, by using digital logic.

For example, the arbitration controller 30 is configured to determine whether the TCON accesses the non-volatile memory 20, and when the TCON accesses the non-volatile memory 20, block the TIC from communicating with the non-volatile memory 20, or when the TCON does not access the non-volatile memory 20, schedule the TIC to communicate with the non-volatile memory 20.

Because the TCON needs to access the non-volatile memory 20 only in the power-on initialization process (for example, about 60 milliseconds), after power-on initialization, the TCON no longer needs to access the non-volatile memory 20. Therefore, when determining that the TCON does not access the non-volatile memory 20, the arbitration controller 30 schedules the TIC to communicate with the non-volatile memory 20.

The arbitration controller 30 may alternatively be integrated on the FPC, and the arbitration controller 30 is coupled to the TIC, the DDIC, and the non-volatile memory 20.

In some embodiments, as shown in FIG. 4, the non-volatile memory 20 is disposed on the FPC.

For example, the non-volatile memory 20 is a flash memory.

In this way, a flash memory that is in a mainstream electronic device and that is coupled to the DDIC may be used as the non-volatile memory 20 in the electronic device provided in embodiments of this disclosure. A technical change is small, and implementation is easy.

In some embodiments, the DDIC and the TIC are further coupled through a general-purpose input/output (GPIO) interface. Signal transmission may or may not be performed on the GPIO interface.

In the electronic device provided in embodiments of this disclosure, the TCON and the TIC are jointly designed to share the non-volatile memory 20. No flash memory is integrated into the TIC, and the TIC accesses the non-volatile memory 20 on the FPC by using the SPI 2. The arbitration controller 30 controls the TCON and the TIC to communicate with the non-volatile memory 20 in a time-sharing manner, so that the TCON and the TIC share the non-volatile memory 20, and the TCON and the TIC access the non-volatile memory 20 in a time-sharing manner. In this way, a non-volatile storage requirement of the TIC can also be ensured without integration of a flash memory into the TIC, to resolve a problem that a cost proportion of the flash memory is high (for example, 15% to 25%) because a specific technology compatible with a flash memory preparing process needs to be used to integrate the flash memory in the TIC, and resolve a problem that the TIC cannot be independently prepared because the flash memory needs to be purchased.

Example 2

A main difference between example 2 and example 1 lies in that, an arbitration controller 30 is no longer used to control a TCON and a TIC to communicate with a non-volatile memory 20 in a time-sharing manner, but an enable control line is used to control the TCON and the TIC to communicate with the non-volatile memory 20 in a time-sharing manner.

Figure 5:
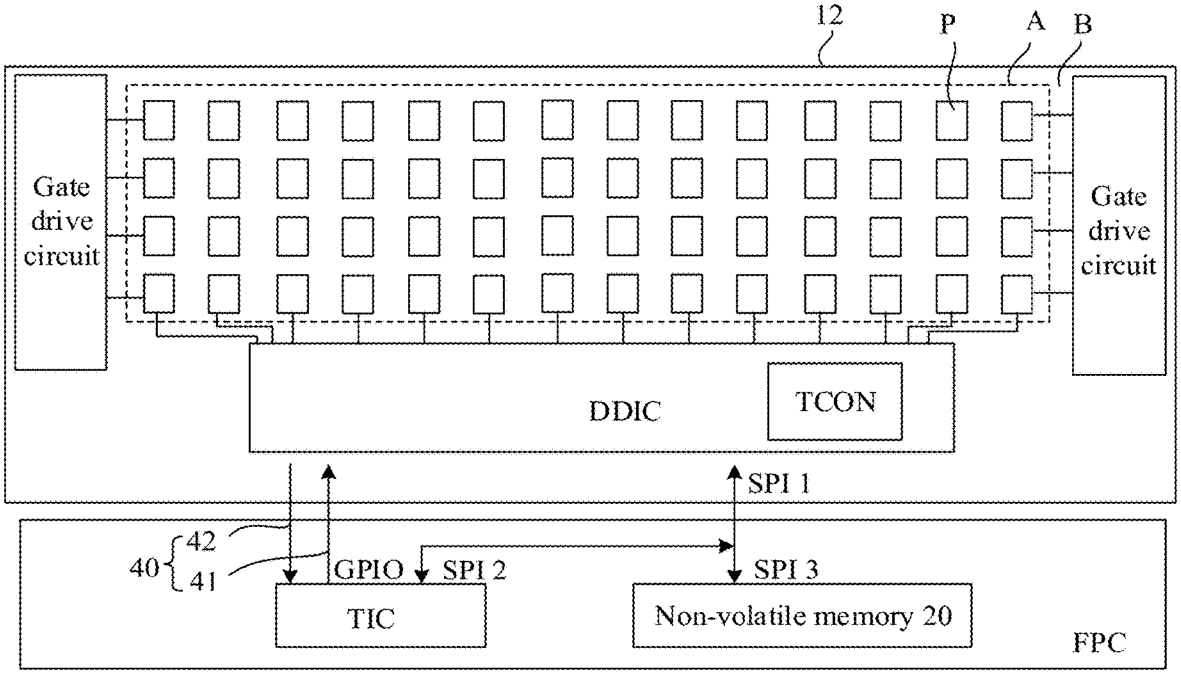
FIG. 5 is a layout diagram of another electronic device according to an embodiment.

As shown in FIG. 5, an electronic device includes a touch display panel 12, a DDIC, the TCON, the TIC, a FPC, and the non-volatile memory 20.

The TCON is integrated into the DDIC, the non-volatile memory 20 is disposed outside the TIC, and the non-volatile memory 20 is configured to provide a non-volatile storage function for both the TCON and the TIC.

In some embodiments, the electronic device further includes the enable control line 40. The enable control line 40 is configured to select and enable the TCON or the TIC to perform signal transmission with the non-volatile memory 20.

In this case, the enable control line 40 is configured to select and enable the TCON and the TIC to access and be externally connected to the non-volatile memory 20 in a time-sharing manner. Under control of an enable signal on the enable control line 40, at a moment, the TCON communicates with the non-volatile memory 20, or the TIC communicates with the non-volatile memory 20. A case in which the TCON and the TIC simultaneously communicate with the non-volatile memory 20 does not occur.

Because the TCON needs to load content to the non-volatile memory 20 only in a power-on initialization process, after loading is completed, the non-volatile memory 20 is no longer accessed in a subsequent display process. Therefore, when the TCON is powered on and initialized, the enable control line 40 selects the TCON to communicate with the non-volatile memory 20, and after the TCON is powered on and initialized, the enable control line 40 selects the TIC to communicate with the non-volatile memory 20. There is no conflict between the TCON and the TIC in time-sharing reuse of the non-volatile memory 20.

In some embodiments, the DDIC has a first communication interface, the TIC has a second communication interface, and the non-volatile memory 20 has a fifth communication interface. The non-volatile memory 20 is coupled to the first communication interface and the second communication interface through the fifth communication interface.

The first communication interface, the second communication interface, and the fifth communication interface are used as communication and interconnection interfaces between the TIC, the DDIC, and the non-volatile memory 20. Communication connections between the TIC, the DDIC, and the non-volatile memory 20 may be implemented through interconnection between the first communication interface, the second communication interface, and the fifth communication interface.

In this embodiment of this disclosure, the first communication interface, the second communication interface, and the fifth communication interface have a function of being in a high-impedance state.

The high-impedance state indicates that a node in a circuit has higher impedance than other points in the circuit.

For example, the first communication interface, the second communication interface, and the fifth communication interface are all SPIs. For example, as shown in FIG. 5, the first communication interface is an SPI 1, the second communication interface is an SPI 2, and the fifth communication interface is an SPI 3.

Two ends of the enable control line 40 are coupled to the DDIC and the TIC, and are configured to implement signal interworking between the DDIC and the TIC.

In some embodiments, the enable control line 40 is a single signal line, and interfaces for coupling the DDIC and the TIC to the enable control line 40 are input/output interfaces. That is, the DDIC may transmit a signal to the TIC by using the enable control line 40, and the DDIC may also receive, by using the enable control line 40, a signal transmitted by the TIC.

The enable control line 40 formed by the single signal line has a small quantity of lines and is easy to lay out.

In some other embodiments, as shown in FIG. 5, the enable control line 40 includes a first control line 41 and a second control line 42. Two ends of the first control line 41 are coupled to the DDIC and the TIC, and two ends of the second control line 42 are coupled to the DDIC and the TIC.

The enable control line 40 includes the first control line 41 and the second control line 42. A signal on each control line is a unidirectional transmission signal. This is easy to implement.

Ports that are in the DDIC and the TIC and that are coupled to the first control line 41 may be, for example, idle GPIO interfaces in the DDIC and the TIC, or may be newly added GPIO interfaces.

When the first control line 41 is valid, the TIC transmits, to the DDIC, a first indication signal indicating that the TIC accesses the non-volatile memory 20, and after the DDIC receives the first indication signal, the DDIC controls the first communication interface (the SPI 1) to be in a high-impedance state. When the first communication interface of the DDIC is in a high-impedance state, the DDIC and the non-volatile memory 20 are equivalent to being in an open-circuit state, there is no signal interworking between the DDIC and the non-volatile memory 20, and the TCON does not access the non-volatile memory 20.

When the second control line 42 is valid, the DDIC transmits, to the TIC, a second indication signal indicating that the TCON accesses the non-volatile memory 20, and after the TIC receives the second indication signal, the TIC controls the second communication interface (the SPI 2) to be in a high-impedance state. When the second communication interface of the TIC is in a high-impedance state, the TIC and the non-volatile memory 20 are equivalent to being in an open-circuit state, there is no signal interworking between the TIC and the non-volatile memory 20, and the TIC does not access the non-volatile memory 20.

In this way, based on a signal transmitted on the enable control line 40, signal interworking between the DDIC and the non-volatile memory 20 is selected and enabled, or signal interworking between the TIC and the non-volatile memory 20 is selected and enabled, and the DDIC and the TIC do not affect each other, so that the TCON and the TIC share the non-volatile memory 20 in a time-sharing manner.

In some embodiments, the first communication interface (the first SPI 1) and the second communication interface (the SPI 2) perform wire-AND.

For example, the first communication interface and the second communication interface perform wire-AND on the FPC.

In this way, a quantity of fifth communication interfaces (SPI 3*s*)) on the non-volatile memory 20 may be reduced, and one fifth communication interface may be coupled to both the first communication interface on the DDIC and the second communication interface on the TIC.

In some embodiments, as shown in FIG. 5, the non-volatile memory 20 is disposed on the FPC.

For example, the non-volatile memory 20 is a flash memory.

In this way, a flash memory that is in a mainstream electronic device and that is coupled to the DDIC may be used as the non-volatile memory 20 in the electronic device provided in embodiments of this disclosure. A technical change is small, and implementation is easy.

In the electronic device provided in embodiments of this disclosure, the TCON and the TIC are jointly designed to share the non-volatile memory 20. No flash memory is integrated into the TIC, and the TIC accesses the non-volatile memory 20 on the FPC by using the second communication interface. The DDIC and the TIC interact with each other by using the enable control line 40. The enable control line 40 controls the DDIC and the TIC to communicate with the non-volatile memory 20 in a time-sharing manner, so that the TCON and the TIC share the non-volatile memory 20, and the TCON and the TIC access the non-volatile memory 20 in a time-sharing manner. In this way, a non-volatile storage requirement of the TIC can also be ensured without integration of a flash memory into the TIC, to resolve a problem that a cost proportion of the flash memory is high (15% to 25%) because a specific technology compatible with a flash memory preparing process needs to be used to integrate the flash memory in the TIC, and resolve a problem that the TIC cannot be independently prepared because the flash memory needs to be purchased.

Example 3

A difference between example 3 and example 1 and example 2 lies in that, a non-volatile memory 20 is not disposed on an FPC, but is integrated into a DDIC.

Figure 6:
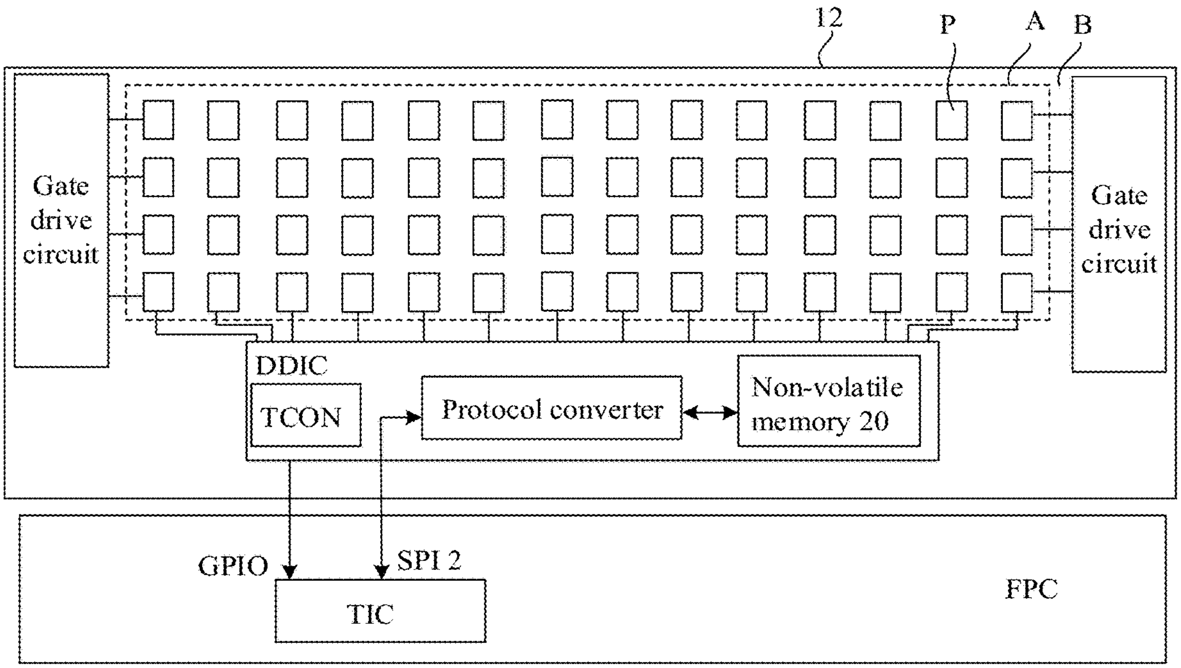
FIG. 6 is a layout diagram of another electronic device according to an embodiment.

As shown in FIG. 6, an electronic device includes a touch display panel 12, the DDIC, a TCON, a TIC, the FPC, and the non-volatile memory 20.

The TCON is integrated into the DDIC, the non-volatile memory 20 is disposed outside the TIC, and the non-volatile memory 20 is configured to provide a non-volatile storage function for both the TCON and the TIC.

In some embodiments, the non-volatile memory 20 is integrated into the DDIC.

In other words, in the electronic device provided in embodiments of this disclosure, the non-volatile memory 20 that is configured to provide non-volatile storage space for the TCON and the TIC is integrated into the DDIC, to replace a flash memory on an FPC in other approaches.

For example, as shown in FIG. 6, the electronic device further includes a protocol converter. The protocol converter is configured to match a communication interface of the TIC with a communication interface of the non-volatile memory 20, so that the TIC accesses the non-volatile memory 20.

In some embodiments, the TIC includes an SPI (for example, an SPI 2), and the non-volatile memory 20 includes a parallel memory interface. The SPI is coupled to the memory interface through the protocol converter, so that the TIC accesses the non-volatile memory 20 in the DDIC by using the SPI.

The TCON in the DDIC may be directly coupled to the non-volatile memory 20 through, for example, the memory interface, and does not need to perform interface protocol conversion by using the protocol converter.

For example, as shown in FIG. 6, the protocol converter is integrated into the DDIC.

In some embodiments, the non-volatile memory 20 is a non-volatile memory.

For example, the non-volatile memory 20 is a read-only memory (ROM) or a flash memory.

For example, the non-volatile memory 20 is a resistive non-volatile memory (resistive random-access memory (RAM) (RRAM)).

In some embodiments, the TCON and the TIC may access the non-volatile memory 20 in a time-sharing manner.

For example, the DDIC and the TIC are controlled to communicate with the non-volatile memory 20 in a time-sharing manner, so that the TCON and the TIC can access the non-volatile memory 20 in a time-sharing manner.

For example, the arbitration controller 30 shown in example 1 is disposed in the DDIC, and the arbitration controller 30 is used to schedule the TCON or the TIC to communicate with the non-volatile memory 20.

In this case, the arbitration controller 30 is used for the TCON and the TIC to access and be externally connected to the non-volatile memory 20 in a time-sharing manner. Under scheduling of the arbitration controller 30, at a moment, the TCON communicates with the non-volatile memory 20, or the TIC communicates with the non-volatile memory 20. A case in which the TCON and the TIC simultaneously communicate with the non-volatile memory 20 does not occur.

Alternatively, for example, the enable control line 40 shown in example 2 is disposed between the DDIC and the TIC, and the enable control line 40 is used to select and enable the TCON or the TIC to perform signal transmission with the non-volatile memory 20.

In this case, the enable control line 40 is configured to select and enable the TCON and the TIC to access and be externally connected to the non-volatile memory 20 in a time-sharing manner. Under control of an enable signal on the enable control line 40, at a moment, the TCON communicates with the non-volatile memory 20, or the TIC communicates with the non-volatile memory 20. A case in which the TCON and the TIC simultaneously communicate with the non-volatile memory 20 does not occur.

In some other embodiments, the TCON and the TIC may alternatively access the non-volatile memory 20 by area.

For example, the non-volatile memory 20 is divided into areas. The non-volatile memory 20 includes a first non-volatile storage area and a second non-volatile storage area. The first non-volatile storage area is configured to provide a non-volatile storage function for the TCON, and the second non-volatile storage area is configured to provide a non-volatile storage function for the TIC. In the non-volatile memory 20, an area for providing a non-volatile storage function for the TCON is separated from an area for providing a non-volatile storage function for the TIC, so that the TCON and the TIC access the non-volatile memory 20 by area.

In the electronic device provided in embodiments of this disclosure, the TCON and the TIC are jointly designed to share the non-volatile memory 20. No flash memory is integrated into the TIC, and the non-volatile memory 20 is integrated into the DDIC. The TIC accesses, by using the SPI, the non-volatile memory 20 integrated into the DDIC, to replace a flash memory in the TIC. In this way, a non-volatile storage requirement of the TIC can also be ensured without integration of a flash memory into the TIC, to resolve a problem that a cost proportion of the flash memory is high (15% to 25%) because a specific technology compatible with a flash memory preparing process needs to be used to integrate the flash memory in the TIC, and resolve a problem that the TIC cannot be independently prepared because the flash memory needs to be purchased.

In another possible implementation, the TCON is disposed on the FPC. For example, the electronic device is a large electronic device that does not have a particularly high integration requirement, for example, a notebook computer or a tablet.

Example 4

A main difference between example 4 and example 1 lies in that, an arbitration controller 30 is not integrated into a DDIC, but is integrated into a TCON.

Figure 7:
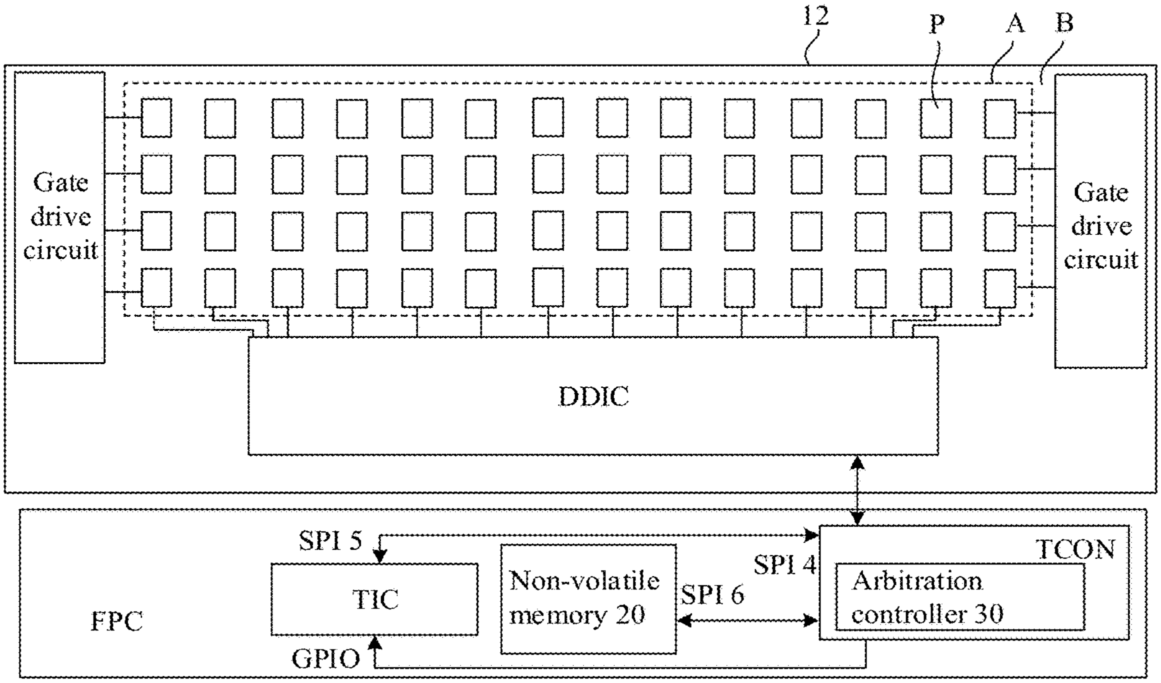
FIG. 7 is a layout diagram of another electronic device according to an embodiment.

As shown in FIG. 7, an electronic device includes a touch display panel 12, the DDIC, a TIC, the TCON, an FPC, and a non-volatile memory 20.

The non-volatile memory 20 is disposed outside the TIC, and the non-volatile memory 20 is configured to provide a non-volatile storage function for both the TCON and the TIC.

The TCON is disposed on the FPC and is configured to provide a timing control signal for the display panel 12. The TCON is coupled to the DDIC, to implement signal transmission between the TCON and the DDIC.

In some embodiments, the electronic device further includes the arbitration controller 30. The arbitration controller 30 is configured to schedule the TCON or the TIC to communicate with the non-volatile memory 20.

In this case, the arbitration controller 30 is configured to control the TCON and the TIC to access and be externally connected to the non-volatile memory 20 in a time-sharing manner. Under scheduling of the arbitration controller 30, at a moment, the TCON communicates with the non-volatile memory 20, or the TIC communicates with the non-volatile memory 20. A case in which the TCON and the TIC simultaneously communicate with the non-volatile memory 20 does not occur.

In some embodiments, as shown in FIG. 7, the arbitration controller 30 is integrated into the TCON.

For example, the TCON has a fourth SPI (SPI 4), the TIC has a fifth SPI (SPI 5), and the non-volatile memory 20 has a sixth SPI (SPI 6). The TIC is coupled to the SPI 4 of the TCON through the SPI 5, to implement coupling between the TIC and the arbitration controller 30 in the TCON. The non-volatile memory 20 is coupled to the SPI 4 of the TCON through the SPI 3, to implement coupling between the non-volatile memory 20 and the arbitration controller 30 in the TCON.

In this way, the arbitration controller 30 is coupled to the TIC, the TCON, and the non-volatile memory 20. The arbitration controller 30 controls the TIC to communicate with the non-volatile memory 20, or the TCON to communicate with the non-volatile memory 20, to implement time-sharing reuse of the non-volatile memory 20.

For a structure of the arbitration controller 30, in some embodiments, the arbitration controller 30 is configured to determine whether the TCON accesses the non-volatile memory 20, and when the TCON accesses the non-volatile memory 20, block the TIC from communicating with the non-volatile memory 20, or when the TCON does not access the non-volatile memory 20, schedule the TIC to communicate with the non-volatile memory 20.

Because the TCON needs to access the non-volatile memory 20 only in a power-on initialization process (for example, about 60 milliseconds), after power-on initialization, the TCON no longer needs to access the non-volatile memory 20. Therefore, when determining that the TCON does not access the non-volatile memory 20, the arbitration controller 30 schedules the TIC to communicate with the non-volatile memory 20.

In some embodiments, as shown in FIG. 7, the non-volatile memory 20 is disposed on the FPC.

For example, the non-volatile memory 20 is a flash memory.

In this way, a flash memory that is in a mainstream electronic device and that is coupled to the DDIC may be used as the non-volatile memory 20 in the electronic device provided in embodiments of this disclosure. A technical change is small, and implementation is easy.

In some embodiments, the TCON and the TIC are further coupled through a GPIO interface. Signal transmission may or may not be performed on the GPIO interface.

In the electronic device provided in embodiments of this disclosure, the TCON and the TIC are jointly designed, so that the TCON and the TIC share the non-volatile memory 20. No flash memory is integrated into the TIC, and the TIC accesses the non-volatile memory 20 on the FPC by using the SPI 5. The arbitration controller 30 controls the TCON and the TIC to communicate with the non-volatile memory 20 in a time-sharing manner, so that the TCON and the TIC share the non-volatile memory 20, and the TCON and the TIC access the non-volatile memory 20 in a time-sharing manner. In this way, a non-volatile storage requirement of the TIC can also be ensured without integration of a flash memory into the TIC, to resolve a problem that a cost proportion of the flash memory is high (15% to 25%) because a specific technology compatible with a flash memory preparing process needs to be used to integrate the flash memory in the TIC, and resolve a problem that the TIC cannot be independently prepared because the flash memory needs to be purchased.

Example 5

A main difference between example 5 and example 2 lies in that, an arbitration controller 30 is not integrated into a DDIC, but is integrated into a TCON.

Figure 8:
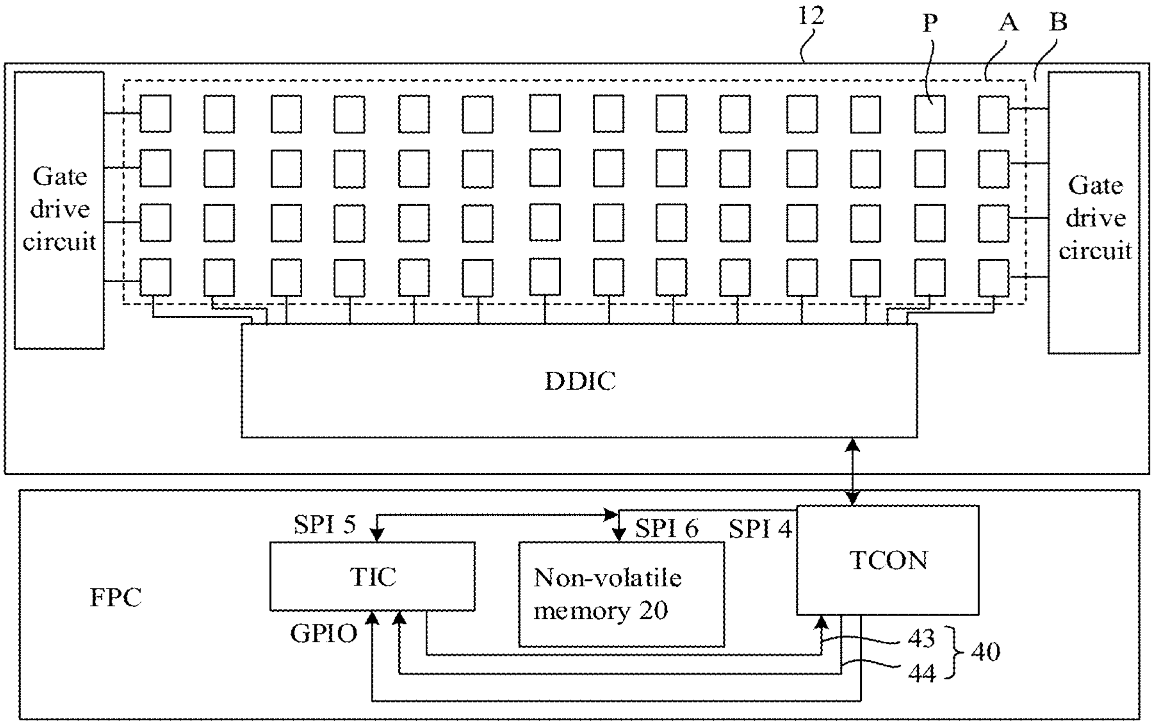
FIG. 8 is a layout diagram of another electronic device according to an embodiment.

As shown in FIG. 8, an electronic device includes a touch display panel 12, the DDIC, a TIC, the TCON, an FPC, and a non-volatile memory 20.

The non-volatile memory 20 is disposed outside the TIC, and the non-volatile memory 20 is configured to provide a non-volatile storage function for both the TCON and the TIC.

The TCON is disposed on the FPC and is configured to provide a timing control signal for the display panel 12. The TCON is coupled to the DDIC, to implement signal transmission between the TCON and the DDIC.

In some embodiments, the electronic device further includes an enable control line 40. The enable control line 40 is configured to select and enable the TCON or the TIC to perform signal transmission with the non-volatile memory 20.

In this case, the enable control line 40 is configured to select and enable the TCON and the TIC to access and be externally connected to the non-volatile memory 20 in a time-sharing manner. Under control of an enable signal on the enable control line 40, at a moment, the TCON communicates with the non-volatile memory 20, or the TIC communicates with the non-volatile memory 20. A case in which the TCON and the TIC simultaneously communicate with the non-volatile memory 20 does not occur.

In some embodiments, the TCON has a third communication interface, the TIC has a fourth communication interface, and the non-volatile memory 20 has a sixth communication interface. The non-volatile memory 20 is coupled to the third communication interface and the fourth communication interface through the sixth communication interface.

The third communication interface, the fourth communication interface, and the sixth communication interface are used as communication and interconnection interfaces between the TIC, the TCON, and the non-volatile memory 20. Communication connections between the TIC, the TCON, and the non-volatile memory 20 may be implemented through interconnection between the third communication interface, the fourth communication interface, and the sixth communication interface.

In this embodiment of this disclosure, the third communication interface, the fourth communication interface, and the sixth communication interface have a function of being in a high-impedance state.

For example, the fourth communication interface, the third communication interface, and the sixth communication interface are all SPIs. For example, as shown in FIG. 8, the third communication interface is an SPI 4, the fourth communication interface is an SPI 5, and the sixth communication interface is an SPI 6.

Two ends of the enable control line 40 are coupled to the TCON and the TIC, and are configured to implement signal interworking between the TCON and the TIC.

In some embodiments, the enable control line 40 is a single signal line, and interfaces for coupling the TCON and the TIC to the enable control line 40 are input/output interfaces. That is, the TCON may transmit a signal to the TIC by using the enable control line 40, and the TCON may also receive, by using the enable control line 40, a signal transmitted by the TIC.

The enable control line 40 formed by the single signal line has a small quantity of lines and is easy to lay out.

In some other embodiments, as shown in FIG. 8, the enable control line 40 includes a third control line 43 and a fourth control line 44.

Two ends of the third control line 43 are coupled to the TCON and the TIC, and two ends of the fourth control line 44 are coupled to the TCON and the TIC.

The enable control line 40 includes the third control line 43 and the fourth control line 44. A signal on each control line is a unidirectional transmission signal. This is easy to implement.

Ports that are in the TCON and the TIC and that are coupled to the third control line 43 may be, for example, idle GPIO interfaces in the TCON and the TIC, or may be newly added GPIO interfaces.

When the third control line 43 is valid, the TIC transmits, to the TCON, a third indication signal indicating that the TIC accesses the non-volatile memory 20, and after the TCON receives the third indication signal, the TCON controls the third communication interface (the SPI 4) to be in a high-impedance state. When the third communication interface of the TCON is in a high-impedance state, the TCON and the non-volatile memory 20 are equivalent to being in an open-circuit state, there is no signal interworking between the TCON and the non-volatile memory 20, and the TCON does not access the non-volatile memory 20.

When the fourth control line 44 is valid, the TCON transmits, to the TIC, a fourth indication signal indicating that the TCON accesses the non-volatile memory 20, and after the TIC receives the fourth indication signal, the TIC controls the fourth communication interface (the SPI 5) to be in a high-impedance state. When the fourth communication interface of the TIC is in a high-impedance state, the TIC and the non-volatile memory 20 are equivalent to being in an open-circuit state, there is no signal interworking between the TIC and the non-volatile memory 20, and the TIC does not access the non-volatile memory 20.

In this way, based on a signal transmitted on the enable control line 40, signal interworking between the TCON and the non-volatile memory 20 is selected and enabled, or signal interworking between the TIC and the non-volatile memory 20 is selected and enabled, and the TCON and the TIC do not affect each other, to implement time-sharing reuse of the non-volatile memory 20.

In some embodiments, the third communication interface (the SPI 4) and the fourth communication interface (the SPI 5) perform wire-AND.

For example, the third communication interface and the fourth communication interface perform wire-AND on the FPC.

In this way, a quantity of sixth communication interfaces (SPI 6*s*) on the non-volatile memory 20 may be reduced, and one sixth communication interface may be coupled to both the third communication interface on the DDIC and the fourth communication interface on the TIC.

In some embodiments, as shown in FIG. 8, the non-volatile memory 20 is disposed on the FPC.

For example, the non-volatile memory 20 is a flash memory.

In this way, a flash memory that is in a mainstream electronic device and that is coupled to the TCON may be used as the non-volatile memory 20 in the electronic device provided in embodiments of this disclosure. A technical change is small, and implementation is easy.

In the electronic device provided in embodiments of this disclosure, the TCON and the TIC are jointly designed, so that the TCON and the TIC share the non-volatile memory 20. No flash memory is integrated into the TIC, and the TIC accesses the non-volatile memory 20 on the FPC by using the fourth communication interface. The TCON and the TIC interact with each other by using the enable control line 40. The enable control line 40 controls the TCON and the TIC to communicate with the non-volatile memory 20 in a time-sharing manner, so that the TCON and the TIC share the non-volatile memory 20, and the TCON and the TIC access the non-volatile memory 20 in a time-sharing manner. In this way, a non-volatile storage requirement of the TIC can also be ensured without integration of a flash memory into the TIC, to resolve a problem that a cost proportion of the flash memory is high (15% to 25%) because a specific technology compatible with a flash memory preparing process needs to be used to integrate the flash memory in the TIC, and resolve a problem that the TIC cannot be independently prepared because the flash memory needs to be purchased.

Example 6

A main difference between example 6 and example 3 lies in that, a non-volatile memory 20 is not integrated into a DDIC, but is integrated into a TCON.

Figure 9:
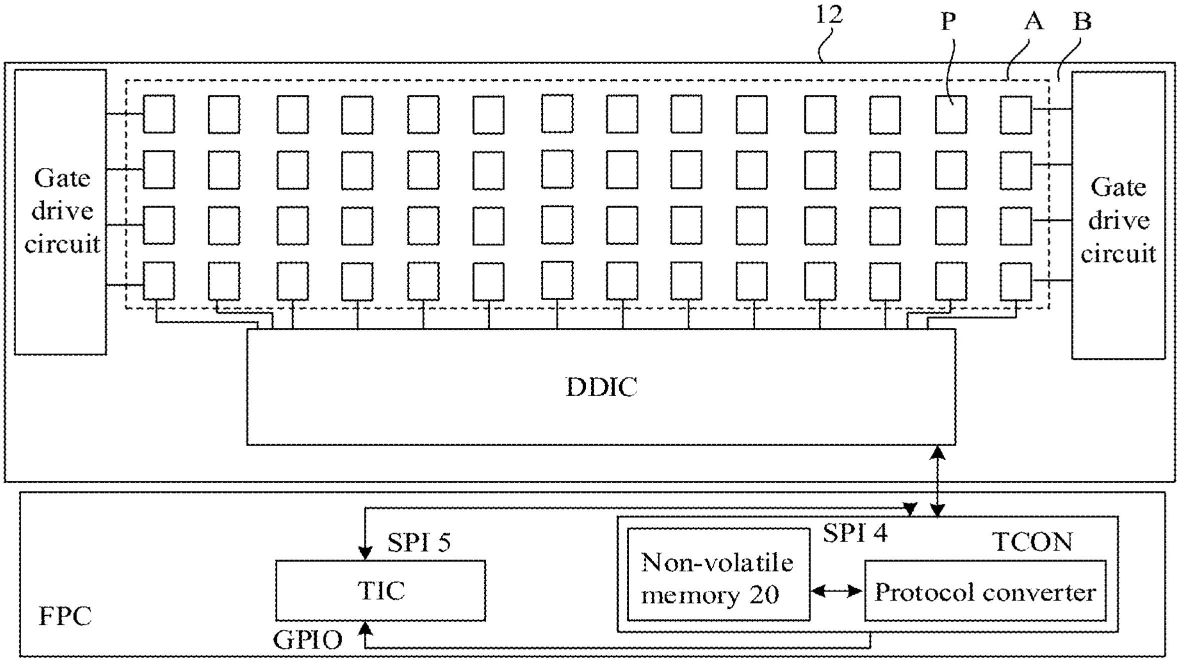
FIG. 9 is a layout diagram of another electronic device according to an embodiment.

As shown in FIG. 9, an electronic device includes a touch display panel 12, the DDIC, a TIC, the TCON, an FPC, and the non-volatile memory 20.

The non-volatile memory 20 is disposed outside the TIC, and the non-volatile memory 20 is configured to provide a non-volatile storage function for both the TCON and the TIC.

In some embodiments, the TCON is disposed on the FPC, and the non-volatile memory 20 is integrated into the TCON.

In other words, in the electronic device provided in embodiments of this disclosure, the non-volatile memory 20 that is configured to provide non-volatile storage space for the TCON and the TIC is integrated into the TCON, to replace a flash memory directly disposed on an FPC in the other approaches.

For example, as shown in FIG. 9, the electronic device further includes a protocol converter. The protocol converter is configured to match a communication interface of the TIC with a communication interface of the non-volatile memory 20, so that the TIC accesses the non-volatile memory 20.

In some embodiments, the TIC includes an SPI (for example, an SPI 5), and the non-volatile memory 20 includes a memory interface. The serial peripheral interface (for example, the SPI 5) of the TIC is coupled to an SPI (for example, an SPI 4) of the TCON, and then is coupled to the memory interface of the non-volatile memory 20 through the protocol converter, so that the TIC accesses the non-volatile memory 20 in the TCON by using the SPI.

The TCON may be directly coupled to the non-volatile memory 20 through, for example, the memory interface, and the TCON is coupled to the non-volatile memory 20 without performing interface protocol conversion by using the protocol converter.

For example, as shown in FIG. 9, the protocol converter is integrated into the TCON.

In some embodiments, the non-volatile memory 20 is a read-only memory or a flash memory. For example, the non-volatile memory 20 is a resistive non-volatile memory.

In some embodiments, the TCON and the TIC may access the non-volatile memory 20 in a time-sharing manner.

For example, the arbitration controller 30 shown in example 4 is disposed in the TCON, and the arbitration controller 30 is used to schedule the TCON or the TIC to communicate with the non-volatile memory 20.

In this case, the arbitration controller 30 is configured to control the TCON and the TIC to access and be externally connected to the non-volatile memory 20 in a time-sharing manner. Under scheduling of the arbitration controller 30, at a moment, the TCON communicates with the non-volatile memory 20, or the TIC communicates with the non-volatile memory 20. A case in which the TCON and the TIC simultaneously communicate with the non-volatile memory 20 does not occur.

Alternatively, for example, the enable control line 40 shown in example 5 is disposed between the TCON and the TIC, and the enable control line 40 is used to select and enable the TCON or the TIC to perform signal transmission with the non-volatile memory 20.

In this case, the enable control line 40 is configured to select and enable the TCON and the TIC to access and be externally connected to the non-volatile memory 20 in a time-sharing manner. Under control of an enable signal on the enable control line 40, at a moment, the TCON communicates with the non-volatile memory 20, or the TIC communicates with the non-volatile memory 20. A case in which the TCON and the TIC simultaneously communicate with the non-volatile memory 20 does not occur.

In some other embodiments, the TCON and the TIC may alternatively access the non-volatile memory 20 by area.

For example, the non-volatile memory 20 is divided into areas. The non-volatile memory 20 includes a first non-volatile storage area and a second non-volatile storage area. The first non-volatile storage area is configured to provide a non-volatile storage function for the TCON, and the second non-volatile storage area is configured to provide a non-volatile storage function for the TIC. In the non-volatile memory 20, an area for providing a non-volatile storage function for the TCON is separated from an area for providing a non-volatile storage function for the TIC, so that the TCON and the TIC access the non-volatile memory 20 by area.

In the electronic device provided in embodiments of this disclosure, the TCON and the TIC are jointly designed, so that the TCON and the TIC share the non-volatile memory 20. No flash memory is integrated into the TIC, and the non-volatile memory 20 is integrated into the TCON. The TIC accesses, by using the SPI, the non-volatile memory 20 integrated into the TCON, to replace a flash memory in the TIC. In this way, a non-volatile storage requirement of the TIC can also be ensured without integration of a flash memory into the TIC, to resolve a problem that a cost proportion of the flash memory is high (15% to 25%) because a specific technology compatible with a flash memory preparing process needs to be used to integrate the flash memory in the TIC, and resolve a problem that the TIC cannot be independently prepared because the flash memory needs to be purchased.

The foregoing descriptions are merely examples of implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

The invention claimed is:

1. An electronic device comprising:

a touch display panel;

a timing controller coupled to the touch display panel and configured to provide a timing control signal for the touch display panel;

a circuit board coupled to the touch display panel;

a touch integrated circuit disposed on the circuit board and configured to provide a touch signal for the touch display panel;

a non-volatile memory disposed outside the touch integrated circuit, coupled to the timing controller and the touch integrated circuit, and configured to provide a non-volatile storage function for both the timing controller and the touch integrated circuit; and an arbitration controller configured to schedule either the timing controller or the touch integrated circuit to communicate with the non-volatile memory, wherein the arbitration controller is further configured to:

determine whether the timing controller accesses the non-volatile memory;

block the touch integrated circuit from communicating with the non-volatile memory when the timing controller accesses the non-volatile memory; and schedule the touch integrated circuit to communicate with the non-volatile memory when the timing controller does not access the non-volatile memory.

2. The electronic device of claim 1, further comprising a display driver integrated circuit, wherein at least one of the timing controller and the arbitration controller is integrated into the display driver integrated circuit.

3. The electronic device of claim 1, wherein the timing controller is disposed on the circuit board, and wherein the arbitration controller is integrated into the timing controller.

4. The electronic device of claim 1, further comprising an enable control line coupled to the timing controller and the touch integrated circuit and configured to selectively enable either the timing controller or the touch integrated circuit to perform signal transmission with the non-volatile memory.

5. The electronic device of claim 4, further comprising a display driver integrated circuit, wherein the timing controller is integrated into the display driver integrated circuit, wherein the display driver integrated circuit comprises a first communication interface, wherein the touch integrated circuit comprises a second communication interface, wherein the non-volatile memory is coupled to the first communication interface and the second communication interface, wherein two ends of the enable control line are coupled to the display driver integrated circuit and the touch integrated circuit, wherein the enable control line comprises a first control line and a second control line, wherein the display driver integrated circuit is configured to control the first communication interface to be in a first high-impedance state when the first control line is valid, and wherein the touch integrated circuit is configured to control the second communication interface to be in a second high-impedance state when the second control line is valid.

6. The electronic device of claim 5, wherein the first communication interface and the second communication interface are configured to perform a wire-AND operation.

7. The electronic device of claim 4, wherein the timing controller is disposed on the circuit board and comprises a first communication interface, wherein the touch integrated circuit comprises a second communication interface, wherein the non-volatile memory is coupled to the first communication interface and the second communication interface, wherein two ends of the enable control line are coupled to the timing controller and the touch integrated circuit, wherein the enable control line comprises a first control line and a second control line, wherein the timing controller is configured to control the first communication interface to be in a first high-impedance state when the first control line is valid, and wherein the touch integrated circuit is configured to control the second communication interface to be in a second high-impedance state when the second control line is valid.

8. The electronic device of claim 7, wherein the first communication interface and the second communication interface are configured to perform a wire-AND operation.

9. The electronic device of claim 5, wherein the first communication interface and the second communication interface are serial peripheral interfaces.

10. The electronic device of claim 1, wherein the non-volatile memory comprises a flash memory.

11. The electronic device of claim 1, wherein the non-volatile memory is disposed on the circuit board.

12. The electronic device of claim 1, further comprising a display driver integrated circuit, wherein the timing controller and the non-volatile memory are integrated into the display driver integrated circuit.

13. The electronic device of claim 1, wherein the timing controller is disposed on the circuit board, and wherein the non-volatile memory is integrated into the timing controller.

14. The electronic device of claim 12, wherein the touch integrated circuit comprises a first communication interface, wherein the non-volatile memory comprises a second communication interface, and wherein the electronic device further comprises a protocol converter configured to match the first communication interface with the second communication interface.

15. The electronic device of claim 14, wherein the touch integrated circuit comprises a serial peripheral interface, wherein the non-volatile memory comprises a memory interface, and wherein the serial peripheral interface is coupled to the memory interface through the protocol converter.

16. The electronic device of claim 14, wherein the protocol converter is integrated into the display driver integrated circuit or the timing controller.

17. The electronic device of claim 12, wherein the non-volatile memory comprises:

a first non-volatile storage area configured to provide the non-volatile storage function for the timing controller; and a second non-volatile storage area configured to provide the non-volatile storage function for the touch integrated circuit.

18. The electronic device of claim 7, wherein the first communication interface and the second communication interface are serial peripheral interfaces.

19. An electronic device comprising:

a touch display panel;

a timing controller coupled to the touch display panel and configured to provide a timing control signal for the touch display panel;

a circuit board coupled to the touch display panel;

a touch integrated circuit disposed on the circuit board and configured to provide a touch signal for the touch display panel;

a non-volatile memory disposed outside the touch integrated circuit, coupled to the timing controller and the touch integrated circuit, and configured to provide a non-volatile storage function for both the timing controller and the touch integrated circuit;

an enable control line coupled to the timing controller and the touch integrated circuit and configured to selectively enable either the timing controller or the touch integrated circuit to perform signal transmission with the non-volatile memory; and a display driver integrated circuit, wherein the timing controller is integrated into the display driver integrated circuit, wherein the display driver integrated circuit comprises a first communication interface, wherein the touch integrated circuit comprises a second communication interface, wherein the non-volatile memory is coupled to the first communication interface and the second communication interface, wherein two ends of the enable control line are coupled to the display driver integrated circuit and the touch integrated circuit, wherein the enable control line comprises a first control line and a second control line, wherein the display driver integrated circuit is configured to control the first communication interface to be in a first high-impedance state when the first control line is valid, and wherein the touch integrated circuit is configured to control the second communication interface to be in a second high-impedance state when the second control line is valid.

20. An electronic device comprising:

a touch display panel;

a timing controller coupled to the touch display panel and configured to provide a timing control signal for the touch display panel;

a circuit board coupled to the touch display panel;

a touch integrated circuit disposed on the circuit board and configured to provide a touch signal for the touch display panel;

a non-volatile memory disposed outside the touch integrated circuit, coupled to the timing controller and the touch integrated circuit, and configured to provide a non-volatile storage function for both the timing controller and the touch integrated circuit; and an enable control line coupled to the timing controller and the touch integrated circuit and configured to selectively enable either the timing controller or the touch integrated circuit to perform signal transmission with the non-volatile memory, wherein the timing controller is disposed on the circuit board and comprises a first communication interface, wherein the touch integrated circuit comprises a second communication interface, wherein the non-volatile memory is coupled to the first communication interface and the second communication interface, wherein two ends of the enable control line are coupled to the timing controller and the touch integrated circuit, wherein the enable control line comprises a first control line and a second control line, wherein the timing controller is configured to control the first communication interface to be in a first high-impedance state when the first control line is valid, and wherein the touch integrated circuit is configured to control the second communication interface to be in a second high-impedance state when the second control line is valid.

* * * * *